United States Patent [19]
Heathman et al.

[11] Patent Number: 6,124,246
[45] Date of Patent: Sep. 26, 2000

[54] HIGH TEMPERATURE EPOXY RESIN COMPOSITIONS, ADDITIVES AND METHODS

[75] Inventors: James F. Heathman, Katy, Tex.; Rick L. Covington; Bill W. Loughridge, both of Duncan, Okla.

[73] Assignee: Halliburton Energy Services, Inc., Duncan, Okla.

[21] Appl. No.: 08/972,066

[22] Filed: Nov. 17, 1997

[51] Int. Cl.[7] .............................. C09K 3/00; C09K 7/00; E21B 33/13

[52] U.S. Cl. ................... 507/219; 507/242; 507/261; 507/271; 507/272; 507/277; 166/295; 523/130

[58] Field of Search ................. 166/295; 507/261, 507/219, 242, 271, 272, 277; 523/130

[56] References Cited

U.S. PATENT DOCUMENTS

| | | | |
|---|---|---|---|
| 2,815,079 | 12/1957 | Goins, Jr. et al. | 166/29 |
| 3,082,823 | 3/1963 | Hower | 166/29 |
| 3,208,525 | 9/1965 | Caldwell et al. | 166/33 |
| 3,310,111 | 3/1967 | Pavlich et al. | 166/33 |
| 3,416,604 | 12/1968 | Rensvold | 166/33 |
| 3,467,208 | 9/1969 | Kelly | 175/72 |
| 3,612,181 | 10/1971 | Brooks, Jr. | 166/295 |
| 3,750,768 | 8/1973 | Suman, Jr. et al. | 175/72 |
| 3,782,466 | 1/1974 | Lawson et al. | 166/254 |
| 3,894,977 | 7/1975 | Brown et al. | 260/18 EP |
| 3,933,204 | 1/1976 | Knapp | 166/295 |
| 3,960,801 | 6/1976 | Cole et al. | 260/33.6 EP |
| 3,976,135 | 8/1976 | Anderson | 166/276 |
| 4,042,031 | 8/1977 | Knapp | 166/276 |
| 4,042,032 | 8/1977 | Anderson et al. | 166/276 |
| 4,072,194 | 2/1978 | Cole et al. | 166/295 |
| 4,101,474 | 7/1978 | Copeland et al. | 260/13 |
| 4,107,112 | 8/1978 | Latta, Jr. et al. | 260/18 EP |
| 4,113,015 | 9/1978 | Meijs | 166/295 |
| 4,127,173 | 11/1978 | Watkins et al. | 166/276 |
| 4,189,002 | 2/1980 | Martin | 166/295 |
| 4,199,484 | 4/1980 | Murphey | 260/13 |
| 4,215,001 | 7/1980 | Elphingstone et al. | 252/8.55 C |
| 4,216,829 | 8/1980 | Murphey | 166/276 |
| 4,220,566 | 9/1980 | Constien et al. | 260/13 |
| 4,272,384 | 6/1981 | Martin | 252/8.55 R |
| 4,336,842 | 6/1982 | Graham et al. | 166/276 |
| 4,339,000 | 7/1982 | Cronmiller | 166/295 |
| 4,367,300 | 1/1983 | Aoke et al. | 524/2 |
| 4,368,136 | 1/1983 | Murphey | 252/316 |
| 4,483,888 | 11/1984 | Wu | 427/336 |
| 4,489,785 | 12/1984 | Cole | 166/295 |
| 4,532,052 | 7/1985 | Weaver et al. | 252/8.55 R |
| 4,558,075 | 12/1985 | Suss et al. | 523/216 |
| 4,620,993 | 11/1986 | Suss et al. | 427/407.1 |
| 4,665,988 | 5/1987 | Murphey et al. | 166/295 |
| 4,741,401 | 5/1988 | Walles | 166/300 |
| 4,773,482 | 9/1988 | Allison | 166/270 |
| 4,785,884 | 11/1988 | Armbruster | 166/280 |
| 4,829,100 | 5/1989 | Murphey et al. | 523/131 |
| 4,921,047 | 5/1990 | Summers et al. | 166/276 |
| 4,972,906 | 11/1990 | McDaniel | 166/276 |
| 5,090,478 | 2/1992 | Summers | 166/278 |
| 5,095,987 | 3/1992 | Weaver et al. | 166/276 |
| 5,107,928 | 4/1992 | Hilterhaus | 166/293 |
| 5,133,409 | 7/1992 | Bour et al. | 166/293 |
| 5,139,772 | 8/1992 | Morita et al. | 424/70 |
| 5,159,980 | 11/1992 | Onan et al. | 166/294 |
| 5,168,928 | 12/1992 | Terry et al. | 166/292 |
| 5,211,234 | 5/1993 | Floyd | 166/276 |
| 5,213,161 | 5/1993 | King et al. | 166/293 |
| 5,232,961 | 8/1993 | Murphey et al. | 523/414 |
| 5,293,938 | 3/1994 | Onan et al. | 166/293 |
| 5,314,023 | 5/1994 | Dartez et al. | 166/295 |
| 5,325,723 | 7/1994 | Meadows et al. | 73/794 |
| 5,335,726 | 8/1994 | Rodrigues | 166/295 |
| 5,337,824 | 8/1994 | Cowan | 166/293 |
| 5,358,044 | 10/1994 | Hale et al. | 166/293 |
| 5,358,051 | 10/1994 | Rodrigues | 166/295 |
| 5,361,841 | 11/1994 | Hale et al. | 166/293 |
| 5,361,842 | 11/1994 | Hale et al. | 166/293 |
| 5,363,918 | 11/1994 | Cowan et al. | 166/295 |
| 5,368,102 | 11/1994 | Dewprashad et al. | 166/276 |
| 5,373,901 | 12/1994 | Norman et al. | 166/300 |
| 5,377,757 | 1/1995 | Ng | 166/277 |
| 5,388,648 | 2/1995 | Jordan | 166/380 |
| 5,428,178 | 6/1995 | Zuzich et al. | 549/378 |
| 5,458,195 | 10/1995 | Totten et al. | 166/293 |
| 5,547,027 | 8/1996 | Chan et al. | 166/295 |
| 5,559,086 | 9/1996 | Dewprashad | 507/219 |
| 5,692,566 | 12/1997 | Surles | 166/295 |
| 5,873,413 | 2/1999 | Chatterji et al. | 166/293 |
| 5,875,844 | 3/1999 | Chatterji et al. | 166/293 |
| 5,875,845 | 3/1999 | Chatterji et al. | 166/293 |
| 5,875,846 | 3/1999 | Chatterji et al. | 166/293 |
| 5,911,282 | 6/1999 | Onan et al. | 175/75 |
| 5,913,364 | 6/1999 | Sweatman | 166/281 |
| 5,957,204 | 9/1999 | Chatterji | 166/295 |
| 5,969,006 | 10/1999 | Onan et al. | 523/166 |
| 6,006,835 | 12/1999 | Onan et al. | 166/295 |
| 6,006,836 | 12/1999 | Chatterji et al. | 166/295 |
| 6,059,035 | 5/2000 | Chatterji et al. | 499/293 |

FOREIGN PATENT DOCUMENTS

| | | | |
|---|---|---|---|
| 0 553 566 A1 | 8/1993 | European Pat. Off. | C21B 43/04 |
| 0 802 253 A1 | 10/1997 | European Pat. Off. | C09K 7/02 |
| 1.315.462 | 12/1962 | France . | |
| 1315462 | 12/1962 | France . | |
| 1-27032 | 10/1989 | Japan . | |
| 1019122 | 2/1966 | United Kingdom | E02D 3/14 |
| WO 91/02703 | 7/1991 | WIPO | C04B 24/24 |
| WO94/12445 | 9/1994 | WIPO | C04B 26/18 |

*Primary Examiner*—Philip Tucker
*Attorney, Agent, or Firm*—Craig W. Roddy; C. Clark Dougherty, Jr.

[57] ABSTRACT

Improved high temperature epoxy resin compositions, additives and methods are provided. A hardenable epoxy resin composition of the present invention is comprised of an epoxy resin, an aromatic diluent, a hardening agent and a hardening retarder for delaying the hardening of the epoxy composition at high temperatures comprised of a liquid which is soluble in the epoxy resin composition having a halide salt dissolved therein.

15 Claims, No Drawings

HIGH TEMPERATURE EPOXY RESIN COMPOSITIONS, ADDITIVES AND METHODS

BACKGROUND OF THE INVENTION

1. Field of the Invention

The present invention relates to improved high temperature epoxy resin compositions, additives and methods useful in sealing subterranean zones penetrated by well bores.

2. Description of the Prior Art

Hardenable epoxy resin compositions are commonly used for sealing subterranean zones penetrated by well bores when the zones contain corrosive fluids. For example, waste liquids such as salt water and acidic materials are often disposed of by injecting them into disposal wells. Such disposal wells penetrate subterranean formations which accept large volumes of waste and are naturally separated from other subterranean formations. When a disposal well or other well containing corrosive fluids is completed in the conventional manner, i.e., a string of steel casing is cemented in the well bore utilizing a hydraulic cement slurry, both the cement and steel casing are subjected to severe corrosion. A result of such corrosion can be that the liquid waste materials leak into and contaminate formations containing useful fluids such as hydrocarbons or potable water.

In order to prevent the corrosion of metal casing and insulate it from corrosive fluids in a disposal well, it has heretofore been the practice to seal the casing in the well bore with a hardenable epoxy resin composition. Epoxy resin compositions are highly resistant to degradation by acids and other corrosive wastes and insure that the wastes being disposed of do not find their way into subterranean locations containing useful recoverable fluids.

The heretofore used epoxy resin compositions have been basically comprised of an epoxy resin, a liquid diluent for the epoxy resin which causes it to have a low enough viscosity to be pumpable and a hardening agent which causes the epoxy resin to harden after an initial period of time during which the composition can be pumped into a desired location. Such epoxy resin compositions and methods of using the compositions are described in U.S. Pat. No. 3,960,801 issued on Jun. 1, 1976 and U.S. Pat. No. 4,072,194 issued on Feb. 7, 1978, both to Cole, et al.

While the Cole, et al. epoxy resin compositions and methods have been used effectively for sealing subterranean zones penetrated by well bores over the years, the compositions have been limited to use in subterranean zones having circulating temperatures below about 190° F. At circulating temperatures above about 190° F., the heretofore utilized epoxy resin compositions have generally not remained pumpable for long enough times to be placed in desired subterranean locations. That is, the high temperatures encountered by the compositions have caused them to increase in viscosity and begin the hardening process too quickly to be placed into desired subterranean locations. The term "high temperatures" is used hereinafter to mean circulating temperatures above about 190° F. Thus, there are needs for improved epoxy resin compositions and methods which can be utilized for sealing subterranean zones at high temperatures.

SUMMARY OF THE INVENTION

The present invention provides high temperature epoxy resin compositions, hardening retarder additives for the compositions and methods of using the compositions which meet the needs described above and overcome the deficiencies of the prior art. The improved high temperature epoxy resin compositions of this invention are basically comprised of an epoxy resin selected from the group of liquid resins formed of epichlorohydrin and bisphenol A; an aromatic diluent comprised of one or more aromatic compounds, the diluent being present in an amount in the range of from about 25% to about 40% by weight of epoxy resin in the composition; a hardening agent selected from the group of 2-ethyl, 4-methyl imidazole carboxylic acid anhydrides and mixtures thereof present in an amount in the range of from about 0.2% to about 0.4% by weight of epoxy resin in the composition; and a hardening retarder additive for delaying the hardening of the epoxy resin composition comprised of a liquid solution containing a halide salt in an amount of in the range of from about 15% to about 42% by weight of the solution. The hardening retarder solution is soluble in the epoxy resin composition and is generally present therein in an amount in the range of from about 0.13% to about 3% by weight of epoxy resin in the composition depending upon the desired hardening delay and the high temperature involved.

Epoxy resin composition hardening retarder additives and methods of using the retarded epoxy resin compositions for sealing subterranean zones are also provided by the present invention.

It is, therefore, a general object of the present invention to provide improved high temperature epoxy resin compositions, additives and methods.

Other and further objects, features and advantages of the present invention will be readily apparent to those skilled in the art upon a reading of the description of preferred embodiments which follows.

DESCRIPTION OF PREFERRED EMBODIMENTS

The present invention provides improved high temperature epoxy resin compositions, epoxy resin composition hardening retarder additives and methods of using the epoxy resin compositions. As mentioned above, epoxy resin compositions used heretofore for sealing subterranean zones penetrated by well bores have been limited to use in subterranean zones having circulating temperatures below about 190° F. At higher temperatures, i.e., circulating temperatures in the range of from about 190° F. to about 300° F., the heretofore used epoxy resin compositions have developed viscosity and started to harden too quickly to allow enough pumping time for the compositions to be placed in their desired subterranean locations. A high temperature epoxy resin composition of this invention which allows sufficient pumping time to be placed in a subterranean zone while being subjected to the high temperatures mentioned above is basically comprised of a liquid epoxy resin, an aromatic diluent for lowering the viscosity of the epoxy resin, a hardening agent for the epoxy resin, and a hardening retarder additive for delaying the hardening of the epoxy resin composition for a time sufficient for the composition to be pumped into a high temperature subterranean zone, i.e., a time period in the range of from about 2 hours to about 6 hours.

Epoxy resins produced from epichlorohydrin and bisphenol A (p,p'-isopropylidenediphenol) are readily available and are particularly suitable for producing a pumpable resin composition hardenable to an impermeable, high strength solid. Suitable such epoxy resins are liquids having molecular weights in the range of from about 200 to about 1000 and having one gram equivalent of epoxide per about 100 to 200 grams of the epoxy resin. A preferred such liquid epoxy resin has a molecular weight of about 400, one gram equivalent of epoxide per about 150 to 200 grams of resin and a viscosity at 25° C. of about 100 to 200 poises. A liquid epoxy resin having the foregoing properties is commercially available under the tradename "EPON 828™" from Shell Chemical Co. of Houston, Tex.

A liquid aromatic diluent is included in the epoxy resin composition so that the composition will have a viscosity low enough to be pumpable. A variety of aromatic diluents can be utilized.

Examples of preferred such aromatic diluents include, but are not limited to, one or more of toluene, ethylbenzene, n-propylbenzene, isopropylbenzene, n-butylbenzene, isobutylbenzene, cyclohexylbenzene, n-hexylbenzene, o-xylene, m-xylene, p-xylene, o-diethylbenzene, m-diethylbenzene, p-ethylbenzene, 2-chloro-p-xylene, o-diisopropylbenzene, m-diisopropylbenzene, p-diisopropylbenzene, 2-nitro-p-xylene, p-cymene, m-cymene, durene, isodurene, 1,2,3-trimethylbenzene, 1,2,4-trimethylbenzene, 1,3,5-trimethylbenzene, 1,3,5-triethylbenzene, 1,2,4-triethylbenzene, o-dibutylbenzene, m-dibutylbenzene, p-dibutylbenzene, penta-methylbenzene, 1-pentyl-3-ethylbenzene, p-pentyltoluene, 1-hexyl-3-isobutylbenzene, m-hexyltoluene, 1-heptyl-3-isopropylbenzene, p-heptyltoluene, 1-heptyl-3-ethylbenzene, 1-octyl-3-butylbenzene, 1-octyl-3-propylbenzene, p-octyltoluene, 1-nonyl-3-ethylbenzene, p-nonyltoluene, 1-dodecyl-3-ethylbenzene, p-isodecyltoluene, 1-decyl-3-isotridecylbenzene and mixtures thereof. A particularly suitable diluent which is presently preferred is a hydrocarbon solvent comprised of from about 50% to about 99% by weight aromatic hydrocarbons which is commercially available under the tradename "CYCLO SOL 63™" from Shell Chemical Co. of Houston, Tex. The aromatic diluent utilized is included in the epoxy resin composition in an amount in the range of from about 25% to about 40% by weight of epoxy resin in the composition.

A variety of hardening agents can be used which will cause an epoxy resin of the type described above to harden into a solid impermeable mass. Of the various hardening agents which can be utilized, 2-ethyl, 4-methyl imidazole and hardening agents of the carboxylic acid anhydride type are preferred. More specifically, carboxylic acid anhydride hardeners include, but are not limited to, methyl-bicyclo [2.2.1] heptene-2,3-dicarboxylic anhydride isomers (marketed by the Allied Chemical Company as "NADIC METHYL ANHYDRIDE™", chlorendic anhydride, phthalic anhydride, pyromellitic dianhydride, succinic anhydride, dodecenyl-succinic anhydride, maleic anhydride, hexahydrophthalic anhydride and mixtures thereof. The most preferred hardening agent is 2-ethyl, 4-methyl imidazole. The hardening agent used is generally included in the epoxy resin composition in an amount of in the range of from about 0.2% to about 0.4% by weight of epoxy resin in the composition.

The hardening retarder additive of this invention for delaying the hardening of the epoxy resin whereby it can be placed in a subterranean zone at high temperatures is comprised of a liquid solution containing a halide salt. The liquid utilized to form the solution must be soluble in the epoxy resin composition and must be capable of dissolving the halide salt utilized. Particularly suitable such liquids which are preferred for use in accordance with this invention are methanol, ethanol, propylene glycol, ethylene glycol monobutyl ether, and propylene glycol monobutyl ether. Of these, propylene glycol monbutyl ether is preferred.

The halide salt in the hardening retarder additive is preferably selected from, but not limited to, ferrous chloride, ferric chloride, ferrous bromide, ferric bromide, cuprous chloride, cupric chloride, cuprous bromide and cupric bromide. Of these, ferric chloride is preferred. The halide salt is dissolved in the liquid hydrocarbon used in an amount of at least about 15% by weight of the resulting solution, preferably an amount in the range of from about 15% to about 42% by weight of the solution. The hardening retarder additive is included in an epoxy resin composition of this invention in an amount in the range of from about 0.13% to about 3% by weight of the epoxy resin in the composition depending upon the time the composition will be pumped and the temperature to which the composition will be heated during pumping. Generally, the quantity of hardening retarder additive (or the quantity of halide salt therein) must be increased as the temperature or the time, or both, increase.

A preferred hardening retarder additive of this invention is a propylene glycol monobutyl ether solution containing ferric chloride in an amount of about 35.7% by weight of the solution. For a temperature of 300° F., this additive is combined with an epoxy resin composition in an amount in the range of from about 0.13% to about 2% by weight of the epoxy resin in the composition to provide pumpability for a time period in the range of from about 2 hours to about 6 hours.

A presently preferred hardenable epoxy resin composition of the present invention for sealing a subterranean zone penetrated by a well bore at high temperatures includes an epoxy resin comprised of epichlorohydrin and bisphenol A having a molecular weight of about 400, one gram equivalent of epoxide per about 150 to 200 grams of resin and a viscosity at 25° C. of about 100 to 200 poises. The composition further includes an aromatic diluent comprised of a hydrocarbon solvent containing from about 50% to about 99% by weight aromatic hydrocarbons (Shell "CLYCO SOL 63™) present in an amount of about 32.4% by weight of the epoxy resin in the composition and a hardening agent comprised of 2-ethyl, 4-methyl imidazole present in an amount of about 0.3% by weight of the epoxy resin in the composition. A hardening retarder additive of this invention comprised of a propylene glycol monbutyl ether solution containing ferric chloride in an amount of about 35.7% by weight of the solution is also included in the composition. The hardening retarder additive is soluble in the epoxy resin composition and is present therein in an amount in the range of from about 0.13% to about 2% by weight of epoxy resin in the composition.

Since it is the quantity of the halide salt in the epoxy resin composition which determines the length of time that hardening is delayed at a particular high temperature, it will be understood by those skilled in the art that the quantity of the halide salt included in the liquid hydrocarbon solution can be varied or the quantity of the solution combined with the epoxy resin composition can be varied, or both. As mentioned, the solution can contain a minimum halide salt content of about 15% by weight of the solution or greater amounts up to a maximum of about 42% by weight of the solution. Generally, it is preferred to dissolve an amount close to the maximum amount of halide salt in the hydrocarbon solvent and to vary the amount of solution combined with the epoxy resin composition to vary the time hardening is delayed.

The methods of the present invention for sealing a subterranean zone penetrated by well bore at high temperatures basically comprise the steps of preparing a pumpable hardenable epoxy resin composition of this invention which does not increase in viscosity and harden for a time period sufficient to pump the composition into the subterranean zone to be sealed, pumping the composition into the zone and then allowing the composition to harden into a solid impermeable mass therein.

In order to further illustrate the compositions, additives and methods of the present invention, the following example is given.

EXAMPLE

A hardenable epoxy resin composition was prepared comprised of an epichlorohydrin and bisphenol A epoxy resin having a molecular weight of about 400, one gram equivalent of epoxide per about 150 to 200 grams of resin and a viscosity at 25° C. of about 100 to 200 poises, an aromatic diluent comprised of the previously desicribed aromatic hydrocarbon solvent sold under the tradename "CYCLO SOL 63™" by Shell Chemical Co. present in an amount of about 32.4% by weight of the epoxy resin in the composition and a hardening agent comprised of 2-ethyl, 4-methyl imidazole present in an amount of about 0.3% by weight of the epoxy resin in the composition. Samples of the epoxy resin composition without the hardening retarder additive of this invention were tested for pumpable times, i.e., the times from mixing to hardening at 160° F. and at 300° F.

Methanol and propylene glycol monbutyl ether were added to additional samples of the unretarded composition in amounts of about 1.75% and about 0.64% by weight of the composition, respectively. These samples were tested for pumpable times at 300° F.

A hardening retarder additive of the present invention, i.e., a methanol solution containing ferric chloride in an amount of about 21.5% by weight of the solution, was added to yet another sample of the unretarded epoxy composition in an amount of about 2.6% by weight of the composition. Another hardening retarder additive of this invention, i.e., a propylene glycol monbutyl ether solution containing ferric chloride in an amount of about 41.4% by weight of the solution, was added to still another sample of the unretarded epoxy composition in an amount of about 0.98% by weight of the composition. The resulting retarded composition containing the methanol solution of ferric chloride was tested for pumpable times at 160° F. and 300° F. The resulting retarded composition containing the propylene glycol monbutyl ether solution of ferric chloride was tested at 300° F. The results of these tests are shown in the Table below.

TABLE

| | PUMPABLE TIME TESTS | | |
|---|---|---|---|
| Epoxy Resin Composition Additive | Quantity of Additive, % by weight of epoxy resin | Pumpable Times, hr:min: 160° F. | 300° F. |
| None (control) | — | 2:40 | 0:50 |
| Methanol | 1.75 | — | 0:47 |
| Propylene glycol monbutyl ether | 0.64 | — | 1:01 |
| Methanol solution of ferric chloride | 2.6 | >21:00 | 3:47 |
| Propylene glycol monobutyl ether solution of ferric chloride | 0.98% | — | 3:05 |

From the Table, it can be seen that the epoxy resin compositions of the present invention containing the hardening retarder additives of the invention have long pumpable times at high temperatures.

Thus, the present invention is well adapted to carry out the objects and attain the ends and advantages mentioned as well as those which are inherent therein. While numerous changes may be made to the invention by those skilled in the art, such changes are encompassed within the spirit of this invention as defined by the appended claims.

What is claimed is:

1. An improved pumpable hardenable epoxy resin composition for sealing a subterranean zone penetrated by a well bore at high temperatures comprising:

an epoxy resin selected from the group of liquid resins comprised of epichlorohydrin and bisphenol A having a molecular weight in the range of from about 200 to about 1000 and having one gram equivalent of epoxide per about 100 to 200 grams of resin;

an aromatic diluent comprised of one or more aromatic compounds, said diluent being present in an amount in the range of from about 25% to about 45% by weight of epoxy resin in said composition;

a hardening agent selected from the group of 2-ethyl, 4-methyl imidazole, carboxylic acid anhydrides and mixtures thereof present in an amount in the range of from about 0.2% to about 0.4% by weight of epoxy resin in said composition; and a hardening retarder for delaying the hardening of said epoxy resin composition comprised of a liquid solution containing a halide salt in an amount of at least about 15% by weight of said solution, said solution being soluble in said epoxy resin composition and being present therein in an amount in the range of from about 0.13% to about 3% by weight of epoxy resin in said composition.

2. The composition of claim 1 wherein said halide salt is present in said solution in an amount in the range of from about 15% to about 42% by weight of said solution.

3. The composition of claim 1 wherein said epoxy resin has a molecular weight of about 400, one gram equivalent of epoxide per about 150 to 200 grams of resin and a viscosity at 25° C. of about 100 to 200 poises.

4. The composition of claim 1 wherein said one or more aromatic compounds are selected from the group consisting of toluene, ethylbenzene, n-propylbenzene; isopropylbenzene, n-butylbenzene, isobutylbenzene, cyclohexylbenzene, n-hexylbenzene, o-xylene, m-xylene, p-xylene, o-diethylbenzene, m-diethylbenzene, p-ethylbenzene, 2-chloro-p-xylene, o-diisopropylbenzene, m-diisopropylbenzene, p-diisopropylbenzene, 2-nitro-p-xylene, p-cymene, m-cymene, durene, isodurene, 1,2,3- trimethylbenzene, 1,2,4-trimethylbenzene, 1,3,5-trimethylbenzene, 1,3,5-triethylbenzene, 1,2,4-triethylbenzene, o-dibutylbenzene, m-dibutylbenzene, p-dibutylbenzene, penta-methylbenzene, 1-pentyl-3-ethylbenzene, p-pentyltoluene, 1-hexyl-3-isobutylbenzene, m-hexyltoluene, 1-heptyl-3-isopropylbenzene, p-heptyltoluene, 1-heptyl-3-ethylbenzene, 1-octyl-3-butylbenzene, 1-octyl-3-propylbenzene, p-octyltoluene, 1-nonyl-3-ethylbenzene, p-nonyltoluene, 1-dodecyl-3-ethylbenzene, p-isodecyltoluene, 1-decyl-3-isotridecylbenzene, a hydrocarbon solvent containing from about 50% to about 99% aromatic hydrocarbons and mixtures thereof.

5. The composition of claim 1 wherein said aromatic diluent is a hydrocarbon solvent containing from about 50% to about 99% aromatic hydrocarbons.

6. The composition of claim 1 wherein said hardening agent is selected from the group of 2-ethyl, 4-methyl imidazole, methyl-bicyclo [2.2.1] heptene-2,3-dicarboxylic anhydride isomers, chlorendic anhydride, phthalic anhydride, pyromellitic dianhydride, succinic anhydride, dodecenylsuccinic anhydride, maleic anhydride, hexahydrophthalic anhydride and mixtures thereof.

7. The composition of claim 1 wherein said hardening agent is 2-ethyl, 4-methyl imidazole.

8. The composition of claim 1 wherein said liquid in of said hardening retarder is selected from the group of methanol, ethanol, propylene glycol, ethylene glycol monobutyl ether and propylene glycol monobutyl ether.

9. The composition of claim 1 wherein said halide salt is selected from the group of ferrous chloride, ferric chloride, ferrous bromide, ferric bromide, cuprous chloride, cupric chloride, cuprous bromide and cupric bromide.

10. An improved pumpable hardenable epoxy resin composition for sealing a subterranean zone penetrated by a well bore at high temperatures comprising:

an epoxy resin comprised of epichlorohydrin and bisphenol A having a molecular weight of about 400, one gram equivalent of epoxide per about 150 to 200 grams of resin and a viscosity at 25° C. of about 100 to 200 poises;

an aromatic diluent comprised of a hydrocarbon solvent containing from about 50% to about 99% aromatic hydrocarbons present in an amount of about 32.4% by weight of said epoxy resin in said composition;

a hardening agent comprised of 2-ethyl, 4-methyl imidazole present in an amount of about 0.3% by weight of said epoxy resin in said composition; and a hardening retarder for delaying the hardening of said epoxy composition comprised of a propylene glycol monobutyl ether solution containing ferric chloride in an amount of about 37.5% by weight of said solution, said solution being soluble in said epoxy resin composition and being present therein in an amount in the range of from about 0.13% to about 2% by weight of epoxy resin in said composition.

11. The composition of claim 10 wherein said ferric chloride is present in said propylene glycol monobutyl ether solution in an amount in the range of from about 15% to about 42% by weight of said solution.

12. A method of sealing a subterranean zone penetrated by a well bore at high temperatures comprising the steps of:

(a) preparing a pumpable hardenable epoxy resin composition comprised of an epoxy resin, an aromatic diluent, a hardening agent and a hardening retarder comprised of a liquid which is soluble in said epoxy resin composition having a halide salt dissolved therein;

(b) pumping said epoxy resin composition into said subterranean zone; and (c) allowing said composition to harden in said zone.

13. The method of claim 12 wherein said halide salt is present in said retarder in an amount in the range of from about 15% to about 42% by weight of said retarder.

14. The method of claim 12 wherein said liquid is selected from the group of methanol, ethanol, propylene glycol, ethylene glycol monobutyl ether and propylene glycol monobutyl ether.

15. The method of claim 12 wherein said halide salt is selected from the group of ferrous chloride, ferric chloride, ferrous bromide, ferric bromide, cuprous chloride, cupric chloride, cuprous bromide and cupric bromide.

* * * * *